United States Patent [19]
Smith et al.

[11] Patent Number: 5,495,544
[45] Date of Patent: Feb. 27, 1996

[54] POLARIZATION-INDEPENDENT ELECTRO-OPTICALLY SWITCHED DIRECTIONAL COUPLER

[75] Inventors: Terry L. Smith, Roseville, Minn.; Daniel V. Attanasio, Clinton, Conn.; James E. Watson, Maplewood, Minn.

[73] Assignee: Minnesota Mining and Manufacturing Company, St. Paul, Minn.

[21] Appl. No.: 408,211

[22] Filed: Mar. 22, 1995

[51] Int. Cl.$^6$ ................................ G02B 6/26; G02B 6/42
[52] U.S. Cl. ................................ 385/41; 385/16
[58] Field of Search ........................ 385/1, 6, 14, 15, 385/16, 24, 28, 41, 46, 69, 95, 92, 99, 130–132; 359/250, 239, 326; 250/361 C

[56] References Cited

U.S. PATENT DOCUMENTS

| | | | |
|---|---|---|---|
| 3,990,776 | 11/1976 | Tseng et al. | 385/6 |
| 4,243,295 | 1/1981 | Alferness | 385/16 |
| 4,752,120 | 6/1988 | Shimizu | 359/250 |
| 4,948,975 | 8/1990 | Erwin et al. | 250/361 C |
| 4,983,006 | 1/1991 | Nishimoto | 385/16 |
| 4,991,923 | 2/1991 | Kino et al. | 385/15 |
| 5,202,941 | 4/1993 | Granestrand | 385/41 |
| 5,255,334 | 10/1993 | Mak et al. | 385/41 |
| 5,260,963 | 11/1993 | Baird et al. | 372/95 |
| 5,317,447 | 5/1994 | Baird et al. | 372/20 |
| 5,341,444 | 8/1994 | Henry et al. | 385/14 |
| 5,400,788 | 3/1995 | Dias et al. | 128/662.03 |

FOREIGN PATENT DOCUMENTS

| | | |
|---|---|---|
| 1-243037 | 9/1989 | Japan . |
| 2223323 | 4/1990 | United Kingdom . |

OTHER PUBLICATIONS

"Optically Biased LiNbO$_3$ Δβ Reversal Directional Coupler Switch," Okayama et al., *Electronics Letters*, vol. 23, No. 21, Oct. 8, 1987, pp. 1145–1147.

"Electro–optically switched coupler with stepped Δβ reversal using Ti–diffused LiNbO$_3$ waveguides," Schmidt et al., *Applied Physics Letters*, vol. 28, No. 9, May 1, 1976, pp. 503–506.

"A Polarization–Independent 1×16 Guided–Wave Optical Switch Integrated on Lithium Niobate," Watson et al., *Journal of Lightwave Technology*, vol. LT–4, No. 11, Nov. 1986, pp. 1717–1721.

*Primary Examiner*—Akm E. Ullah
*Attorney, Agent, or Firm*—Gary L. Griswold; Walter N. Kirn; H. Sanders Gwin, Jr.

[57] ABSTRACT

A polarization-independent electro-optically switched directional coupler utilizing reverse differential propagation constant control comprises an electro-optic material having at least a pair of wave guide channels within an interaction region and at least a pair of electrodes for selectively producing an electric field across the wave guide channels which electro-optically alters an optical propagation constant of the wave guide channels so as to vary the effects of an optical coupling between the wave guide channels. The wave guide channels have a curvature region defined by a constant radius that is selected so as to coincide a set of operating voltages for an optical switch state of the directional coupler for a transverse magnetic (TM) polarization mode with a set of operating voltages for an optical switch state of the directional coupler for a transverse electric (TE) polarization mode by shifting the optical switch state of the TM polarization mode relative to the optical state of the TE polarization mode due to the relative difference between the magnitude of the electro-optic effect for the TM polarization mode light signal in the curvature region and magnitude of the electro-optic effect for the TE polarization mode light signal in the curvature region.

19 Claims, 9 Drawing Sheets

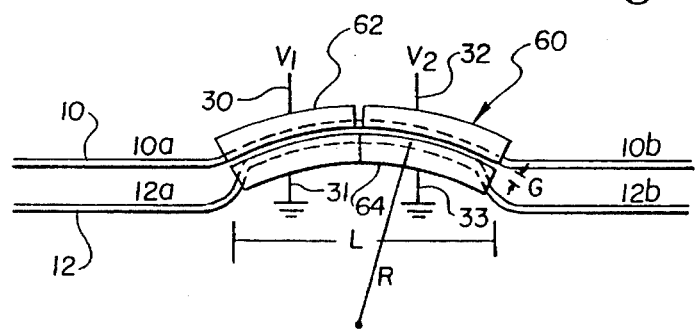
Fig. 3a
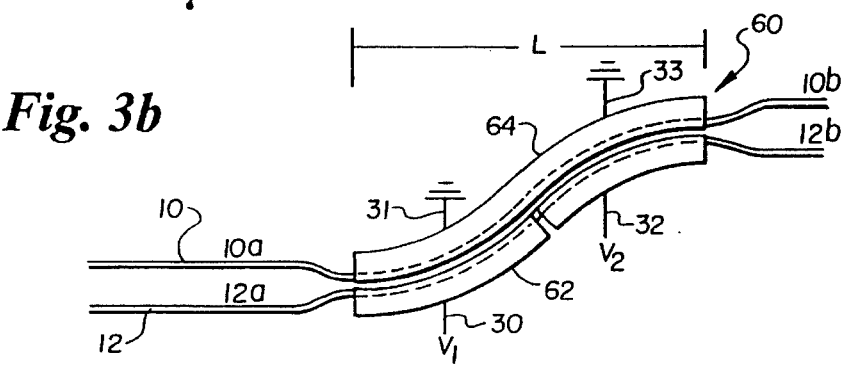
Fig. 3b
Fig. 6a
Fig. 6b
|  | n | L | d | λ | $R_{MIN.}$ | $R_{MAX}$ | $R_{WALKER}$ |
|---|---|---|---|---|---|---|---|
| LITHIUM NIOBATE | 2.2 | 20 | 0.010 | 0.0013 | 300 | 1800 | 270 |
| Ga AS | 3.5 | 2 | 0.005 | 0.0013 | 36/F | 215/F | 22 |
| POLYMER | 1.6 | 10 | 0.010 | 0.0013 | 110 | 670 | 100 |
| LITHIUM NIOBATE | 2.3 | 20 | 0.01 | 0.0008 | 510 | 3100 | 460 |

POLARIZATION-INDEPENDENT ELECTRO-OPTICALLY SWITCHED DIRECTIONAL COUPLER

BACKGROUND OF THE INVENTION

1. Field of the Invention

The present invention relates generally to electro-optically switched directional couplers, and, more particularly, to an electro-optically switched directional coupler utilizing reverse differential propagation constant ($\Delta\beta$) control which has improved polarization-independent and operating voltage tolerant characteristics.

2. Background of the Invention

Electro-optically switched directional couplers are typically used in optical devices and systems to switch light signals among wave guides that are optically coupled together in an electro-optic material. In a typical application, a 2×2 electro-optically switched directional coupler would be connected, for example, to a first pair of optical fibers at input ports and a second pair of optical fibers at output ports. A pair of wave guides defined in the electro-optic material transmit light signals from the input ports to the output ports through a coupling region where the light signals may either cross between channels or stay in the same channel. For example, a light signal entering an input port for a first wave guide can be transferred within the 2×2 directional coupler so as to exit at an output port for a second wave guide, in which case the directional coupler is said to be in a "cross state". Alternatively, the light signal entering the input port for the first wave guide can be passed through the 2×2 directional coupler so as to remain in the first wave guide and exit at an output port for the first wave guide, in which case the directional coupler is said to be in the "bar" state. Because light signals may be passed both ways through a 2×2 directional coupler, light signals might also "enter" the output ports and "exit" the input ports.

Ideally, the directional coupler is designed so as to electro-optically switch the light signals between the cross state and the bar state in response to an electric field that is applied across the coupling region within the directional coupler. The coupling region is located within the directional coupler in a region where the wave guide channels are very close to one another. In this region, the wave guide channels are constructed so as not to restrict the light signal to staying within a particular channel. Consequently, a light signal passing through the coupling region is free to stay within one wave guide channel, cross over to the other wave guide channel, or do both, depending upon the optical transmission properties of the wave guide channels within the coupling region. When an electric field is applied across the coupling region of an electro-optic material, the electric field can change the optical transmission properties of the wave guide channels. As a result, the way in which the light signal passes through the coupling region can also be changed.

In a conventional electro-optically switched directional coupler, two single mode wave guide channels are fabricated in an electro-optically active substrate by increasing the effective refractive index of the substrate in an area corresponding to the wave guide channels. In a coupling region where the wave guide channels are physically close together, the evanescent optical fields of the two channels overlap, resulting in an optical coupling between the wave guide channels. The effect of coupling between the wave guide channels can be selectively controlled by electro-optically modifying the refractive index in the coupling region via an electric field produced by two electrode pairs situated in the coupling region near the wave guide channels. The use of two pairs of electrodes in this manner is referred to as a directional coupler utilizing reverse differential propagation constant ($\Delta\beta$) control. Two electrode pairs, or alternatively two independent control electrodes and a single common electrode, are used to electro-optically modify the refractive index of the coupling region, rather than a single electrode pair, in order to obtain better control of the switch state of the directional coupler.

While it would be desirable if the directional coupler behaved exactly like a digital switch that was always either completely on (the bar state) or completely off (the cross state), the control of the light signal as it passes through the coupler is not that simple. In practice, an electro-optically switched directional coupler behaves more like a leaky two-way valve, with most of the light signal being transferred through the desired wave guide channel, but with some of the light signal leaking out the other wave guide channel. As long as the relative difference between the optical outputs of each wave guide channel is large enough, however, it is still possible to use the coupler as an effective optical switch. When this relative difference between the optical output power of each wave guide channel is expressed as a ratio, it is referred to as the switching extinction ratio of the directional coupler. By convention, the extinction ratio of a reverse $\Delta\beta$ directional coupler is normally defined to be equal to $10 \log_{10}(c/b)$, where b is the output power of the bar port and c is the output power of the cross port. When the directional coupler is behaving in the desired manner of a digital switch, the extinction ratio will typically be greater than 15 dB, meaning that less than about 1/30th of the light signal will be emerging from the non-intended port of the directional coupler. To operate a reverse $\Delta\beta$ control directional coupler in the desired manner like a digital switch, there will be a cross state set of voltages $V_{1c}$ and $V_{2c}$ which represents the operating voltages that should be applied to the pair of electrodes in order to induce a particular directional coupler to operate in the cross state. In addition, there will be a bar state set of voltages $V_{1b}$ and $V_{2b}$ which correspond to the operating voltages that should be applied to the pair of electrodes in order to induce the same directional coupler to operate in the bar state.

With this background in mind, it is possible to discuss the present state of efforts to enhance the operation and utility of reverse $\Delta\beta$ control directional couplers. These efforts generally fall into one of four categories: (1) efforts to increase the switching extinction ratio of the device; (2) efforts to decrease or shift the operating voltages required to operate the device; (3) efforts to decrease the sensitivity of the device to normal variations in operating conditions; and (4) efforts to decrease the sensitivity of the device to variations in the fabrication process. While the present invention is directed to the later two of these four categories, it is helpful to examine the nature of previous work in the other two categories to understand why this work is not necessarily related to the objectives of the present invention.

A variety of design approaches to increase the switching extinction ratio of directional couplers are described in U.S. Pat. No. 5,255,334, issued to Mak et al., including the creation of additional partial wave guides between the wave guide channels, the use of additional electrodes outside of the coupling region, and the creation of additional partial junctions within wave guide channels. In *Electronics Letters* 23, No. 21, 8th October 1987, p. 1145, Okayama et al. describe a directional coupler which uses wave guide channels having differential widths in order to provide a built-in asymmetry between the wave guide channels that decreases the operating voltages of the directional coupler. U.K. Patent 2 223 323 issued to Walker describes a curved directional coupler that also seeks to provide a built-in asymmetry by using differential radii of the wave guide channels to move the relative location of the operating voltages of the device. Japanese patent HEI 1[1989]-243037 issued to Ohta describes an S-shaped curve having a smoothly varying curvature for the wave guide channels that seeks to achieve both of these advantages.

One common problem with all of these directional couplers is that the various designs effectively ignore the dependence of the coupler upon the polarization of the light signals passing through the coupler. With the possible exception of the Ohta patent, each of these references assumes "ideal or controlled operating conditions" for a single directional coupler designed in accordance with these references. In particular, none of these references deal with the case of an optical signal of uncontrolled polarization.

In addition, none of these references address the issue of "inter-device variations" due to the sensitivity of the device to variations in the fabrication process. As used within the present invention, operating conditions will refer to the environmental and control conditions under which the device is to be used, including, for example, the sensitivity of the device to variations in temperature, humidity, operating voltage drift, and input light signal conditions, including the polarization of the input light signals. In practice, the performance of a group of similar electro-optic devices is determined not only by the sensitivity of a given device to the operating conditions, but also by the inter-device variation cause by unavoidable differences in their manufacture.

In a real world application outside of a laboratory environment, the lack of ideal or controlled operating conditions further complicates the problems of inter-device variation when the inter-device variation is large for a group of electro-optic couplers. If the variation from device-to-device is so large as to require individual tuning of each device to insure proper operation, then there can be no mass production or interchangeability of the devices outside the laboratory environment. In real world operating conditions, these issues have resulted in two major problems which currently limit the widespread use of electro-optically switched directional couplers outside a laboratory environment: (1) the lack of polarization independence; and (2) the lack of inter-device uniformity of operating voltage.

Polarization independence refers to the ability of an optical device to perform its intended function regardless of the polarization of the light signal. The polarization of a light signal is defined as the orientation of the electric field components that comprise the light signal as the light signal is electromagnetically propagated through a wave guide. A transverse electric (TE) polarization is defined as when the electric field comprising the light signal is parallel to the surface of the substrate or channel through which the light signal propagates. A transverse magnetic (TM) polarization is defined as when the electric field produced by the light signal is perpendicular to the surface of the substrate or channel.

In most practical applications, the light signals within a directional coupler will be in an uncontrolled polarization state. As result, it is desirable for the optical device to be polarization independent in that the device is designed to function equally as well in any polarization state. Unfortunately, it is very difficult to make a directional coupler polarization independent. Many optical devices which use existing directional couplers have simply ignored the problem of polarization independence. While these devices will function as expected under the right conditions, there will be conditions in which the device will not behave as expected. Most optical devices which make use of existing directional couplers avoid this problem altogether by using light signals of controlled polarization to insure that all of the light passing through the coupler is polarized in the same orientation.

For those directional couplers which have attempted to achieve polarization independence, one common approach is to carefully control the geometries of the directional coupler by selecting the length (L) of the coupling region and/or the spacing (G) between the wave guide channels in the coupling region so as to control an effective coupling length (l) that will contrive the bar and cross states to be consistent regardless of the polarization of the light signal. An alternate approach to achieving polarization independence is described in U.S. Pat. No. 4,243,295 issued to Alferness which employs a spatial tapering of the spacing (G) between the centers of wave guides so as to preserve the TE and TM bar state while allowing independent choice of coupling to achieve the cross state. Still another approach to polarization independence utilizing a four section optical coupler with additional electrodes and control circuitry is described in U.S. Pat. No. 5,202,941 issued to Granestand.

Unfortunately, none of these techniques provides for an optimum solution to the problem of designing polarization independence into a directional coupler. In the conventional approach, the manufacturer of the directional coupler must sacrifice the ability to freely choose the length L and spacing G which might otherwise be varied to achieve other design objectives. While the tapered coupler described by Alferness improves somewhat on the restrictions of the conventional approach, the same types of limitations still exist with respect to the freedom of choice of lengths L and spacings G which are actually useable. In the four section optical coupler described by Granestand, additional electrodes and control circuitry significantly increase the complexity of both fabrication and control of the device.

Inter-device operating voltage tolerance refers to the tolerance range of the operating voltages $V_1$ and $V_2$ to maintaining a given switch state for a group of similar directional couplers. The tolerance range of the operating voltages is determined mainly by two factors. First, variations in operating voltage characteristics can be caused by process variations in the manufacturing of different ones of the directional couplers. Second, variations in operating voltage characteristics will occur with variations in environmental conditions, such as temperature, humidity, electric field exposure, age and the like.

Larger operating voltage tolerances are beneficial in at least three ways. First, larger operating voltage tolerances improve manufacturing yield. The improvement in manufacturing yield can be understood by noting that polarization independence requires a coincidence of the operating voltages for the bar states and cross states for the two principal polarization modes, something which requires accurate control of the coupling characteristics of the wave guides. Because the coupling characteristics of a wave guide are very dependent on the details of the manufacturing process, small fluctuations in the manufacturing process conditions can cause the coupling characteristics to be slightly different than the intended target characteristics required for coincidence. As a result, the operating voltages of the bar states and cross states may not be coincident and the device would fail to meet operational specifications, in which case the time, labor and raw materials to generate the device will have been wasted. Second, larger operating voltage tolerances extend the range of environmental conditions under which a given device will operate. As the operating conditions vary, particularly ambient environmental conditions such as temperature or wavelength, the operating voltages required for correct operation of the two principal polarization modes will change, usually by different amounts for each polarization mode. If these changes cause the operating voltages for the bar states and cross states for the different polarizations to go out of coincidence, the device will cease to be polarization independent. Finally, larger operating voltage tolerances reduce the need for monitoring the switch state in order to provide feedback control for the operating voltages. This reduction in the need for feedback control simplifies the use of the device under different operating conditions, including compensating for changes as the device ages. As a result, the device is easier and less expensive to make and use, and the device can be used in a wider range of applications.

While there is a growing interest in the use of reverse $\Delta\beta$ control directional couplers for optical devices and systems, the current limitations with regard to polarization independence and operating voltage tolerances have effectively limited the use of these devices to laboratory environments or those situations where the cost of artificially simulating laboratory conditions through polarization control and individual tuning of the voltages to each switch is not prohibitive. Consequently, there is a need for an improved reverse $\Delta\beta$ control directional couplers which can overcome the present limitations with regard to polarization independence and inter-device operating voltage tolerances of these devices.

SUMMARY OF THE INVENTION

In accordance with a first embodiment of the present invention, an electro-optically switched directional coupler utilizing reverse differential propagation constant control is provided. The directional coupler is formed of an electro-optic material having at least a pair of wave guide channels within an interaction region that has a given length (L) and has a given effective inter-wave guide channel spacing (G) characterized by an effective coupling length (l). At least a pair of electrodes selectively produce an electric field across the wave guide channels which electro-optically alters an optical propagation constant of the wave guide channels so as to vary an optical coupling between the wave guide channels. A differential optical path length between the wave guide channels is created in a non-electro-optic manner so as to coincide a set of operating voltages for an optical switch state of the directional coupler for a transverse magnetic (TM) polarization mode with a set of operating voltages for the optical sw state of the directional coupler for a transverse electric (TE) polarization mode. By making this modification to the wave guide channels, the operation of the device as a switched directional coupler is effectively independent of the polarization of a light signal incident to the directional coupler when voltages within these coincided sets of operating voltages are applied to the electrodes of the directional coupler.

In accordance with a second embodiment of the present invention, a polarization-independent electro-optically switched directional coupler utilizing reverse differential propagation constant control comprises an electro-optic material having at least a pair of wave guide channels within an interaction region and at least a pair of electrodes for selectively producing an electric field across the wave guide channels which electro-optically alters an optical propagation constant of the wave guide channels so as to vary an optical coupling between the wave guide channels. The wave guide channels have a curvature region defined by a constant radius that is selected so as to coincide a set of operating voltages for a cross state of the directional coupler for a transverse magnetic (TM) polarization mode with a set of operating voltages for a cross state of the directional coupler for a transverse electric (TE) polarization mode. Coincidence of these sets of operating voltages is achieved by shifting the set of operating voltages for the cross state of the TM polarization mode relative to the set of operating voltages for the cross state of the TE polarization mode due to the relative difference between the magnitude of the electro-optic effect of the TM polarization mode light signal in the curvature region and the magnitude of the electro-optic effect of the TE polarization mode light signal in the curvature region.

In a preferred embodiment, the curvature region of the wave guide channels that results in the non electro-optic modification to the relative optical path lengths of the arms of a directional coupler is defined by a constant radius R such that $4nGL/3\lambda F \leq R \leq 6nGL/\lambda$, where n=index of refraction of the electro-optic material, $\lambda$=wavelength of a light signal incident on the directional coupler and $F=r_1/(r_1-r_2)$, where $r_1$ is the stronger, and $r_2$ the weaker electro-optic coefficient for the two polarization modes. This translates into a radius R of between about 20 cm and 3 m, and optimally between about 0.5 and 2.0 m for LiNbO$_3$ having wave guide channels that are formed by doping of Ti and light signals having a wavelength between about 0.5 and 2.0 μm. In addition, the wave guide channels in the curvature region are preferably not parallel, but instead define a converging, differential inter-wave guide channel spacing ($G_d$) having an effective inter-wave guide channel spacing ($G_d'$) equal to the given inter-wave guide channel spacing (G). This structure optically increases a switching extinction ratio of the directional coupler in a manner separate from the non-electro-optic modification of the optical path length.

BRIEF DESCRIPTION OF THE DRAWINGS

FIGS. 3a and 3b are schematic top plan diagrams of a uniformly curved and a reverse-curved polarization-independent reverse $\Delta\beta$ control directional coupler in accordance with the present invention.

FIGS. 4a and 4b are contour plots of switching extinction ratios in terms of the operating voltages $V_1$ and $V_2$ for transverse electric (TE) polarization mode and transverse magnetic (TM) polarization mode, respectively, for the directional coupler shown in FIG. 3a.

FIG. 6a is a graph of the relationship between voltage offset and inverse radius for an embodiment of the present invention.

FIG. 6b is a chart of the ranges of radius for various electro-optic materials in accordance with the present invention.

DESCRIPTION OF THE PREFERRED EMBODIMENT

Figure 1:
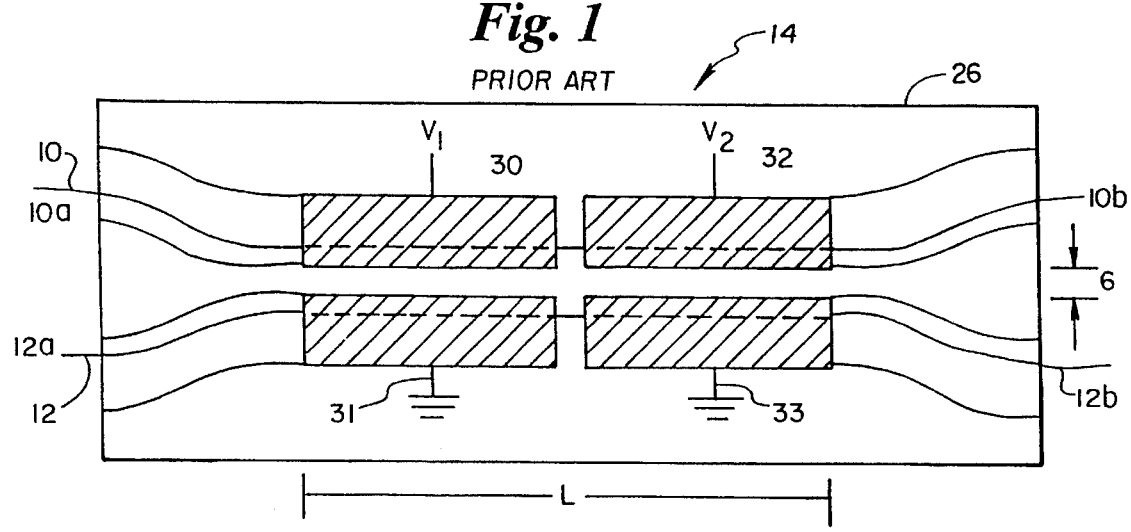
FIG. 1 is a schematic top plan diagram of a conventional reverse $\Delta\beta$ control directional coupler showing wave guide and electrode configurations.

In a conventional 2×2 directional coupler, as shown for example in FIG. 1, a pair of single mode wave guides 10 and 12 carry light signals to and from an electro-optically switched directional coupler 14. A light signal entering coupler 14 from the first wave guide at port 10a can be transferred within coupler 14 so as to exit in the second wave guide at port 12b (in which case coupler 14 is in a "cross state"), or the light signal can be passed through coupler 14 so as to remain in the first wave guide at port 10b (in which case coupler 14 is in the "bar" state). Because light signals can be passed both ways through coupler 14, a light signal might also enter wave guide at port 10b and be transferred so as to exit the second wave guide at port 12a (the "cross" port), or be passed through so as to remain in the first wave guide at port 10a (the "bar" port).

Located within coupler 14 are wave guide channels 20 and 22 which are coupled together by positioning at least a length (L) of channels 20 and 22 very close to one another with an effective separation (G). In this region, known as coupling region 24, wave guide channels 20 and 22 are constructed so as not to restrict the light signal to staying within a particular channel. Consequently, a light signal passing through coupling region 24 is free to either stay within one wave guide channel, cross over to the other wave guide channel, or do both, depending upon the optical transmission properties of wave guide channels 20 and 22 within coupling region 24. In the absence of an applied electric field, the characteristic length required for a light signal to cross from one wave guide channel to the other is referred to as the effective coupling length (l). When an electric field is applied across coupling region 24 it changes the optical transmission properties of wave guide channels 20 and 22. As a result, the way in which the light signal passes through coupling region 24 can also be changed.

In a conventional electro-optically switched directional coupler 14, wave guide channels 20 and 22 are fabricated in an electro-optically active substrate 26 by increasing the refractive index of substrate 26 in the wave guides. Because wave guide channels 20 and 22 are physically close together in coupling region 24, the evanescent optical fields of the two channels overlap, resulting in an optical coupling between wave guide channels 20 and 22. The effect of coupling between wave guide channels 20 and 22 can be selectively controlled by electro-optically modifying the refractive index in the coupling region via an electric field produced by electrode pairs 30, 31 and 32, 33 situated in coupling region 24 near wave guide channels 20 and 22. The use of two pairs of electrodes 30, 31 and 32, 33 in this manner is referred to as a directional coupler utilizing reverse differential propagation constant ($\Delta\beta$) control. Two electrode pairs 30, 31 and 32, 33, or alternatively two independent control electrodes (30 and 32) and a single common electrode (31 and 33 combined), are used rather than a single electrode pair in order to obtain better control of the switch state (cross state or bar state) of directional coupler 14. For a more detailed explanation of reverse differential propagation constant ($\Delta\beta$) control using electrode pairs, reference is made to R. V. Schmidt and H. Kogelnik, "Electro-optically switched coupler with stepped $\Delta\beta$ reversal using Ti-diffused LiNbO$_3$ waveguides", *Applied Physics Letters*, Vol. 28, No. 9, 1 May 1976, pp. 503–506.

While it would be desirable if coupler 14 behaved exactly like a digital switch that was either always on (bar state) or always off (cross state), the control of the light signal as it passes through coupler 14 is not that simple. In practice, coupler 14 behaves more like a leaky two-way valve, with most of the light signal being transferred through the desired wave guide channel, but with some of the light signal leaking out the other wave guide channel. As long as the relative difference between the optical outputs of each wave guide channel is large enough, however, it is still possible to use coupler 14 as an effective optical switch having two operational states, the bar state and the cross state.

It is typical to define the operational state of a directional coupler 14 by the ratio of optical power exiting from the two optical ports 10b and 12b in response to a light signal incident upon optical port 10a. When the relative difference between the optical output power of each wave guide channel is expressed as a ratio, it is referred to as the switching extinction ratio of directional coupler 14. By convention, the extinction ratio of a reverse $\Delta\beta$ directional coupler is normally defined to be equal to $10 \log_{10}(c/b)$, where b is the output power of the bar port and c is the output power of the cross port. When directional coupler 14 is behaving in the desired manner of a digital switch, the extinction ratio will typically be greater than 15 dB, meaning that less than about 1/30th of the light signal will be emerging from the non-intended port of directional coupler 14. To operate a directional coupler 14 in the desired manner of a digital switch, there will be a cross state set of voltages $V_{1c}$ and $V_{2c}$ which represents the operating voltages which should be applied to electrodes 30 and 32 in order to induce a particular directional coupler 14 to operate in the cross state. In addition, there will be a bar state set of voltages $V_{1b}$ and $V_{2b}$ which correspond to the operating voltages which should be applied to electrodes 30 and 32 in order to induce the same directional coupler 14 to operate in the bar state.

The easiest way to understand the operation of a directional coupler designed in accordance with the teachings of the present invention is by examining the "transfer function" of the directional coupler. For purposes of the present invention, the transfer function is a two-dimensional map of the operational states of the directional coupler for all possible combinations of operating voltages $V_1$ and $V_2$ for the cross state, or $V_1$ and $V_2$ for the bar state, or a combination of operating voltages for both states. It will be understood that for different electrode configurations of the directional coupler (e.g., one pair of electrodes or three or more pairs of electrodes) the set of operating voltages for the cross states and bar states of the device will include a number of voltage values corresponding to the number of electrode pair combinations.

Figure 2A:
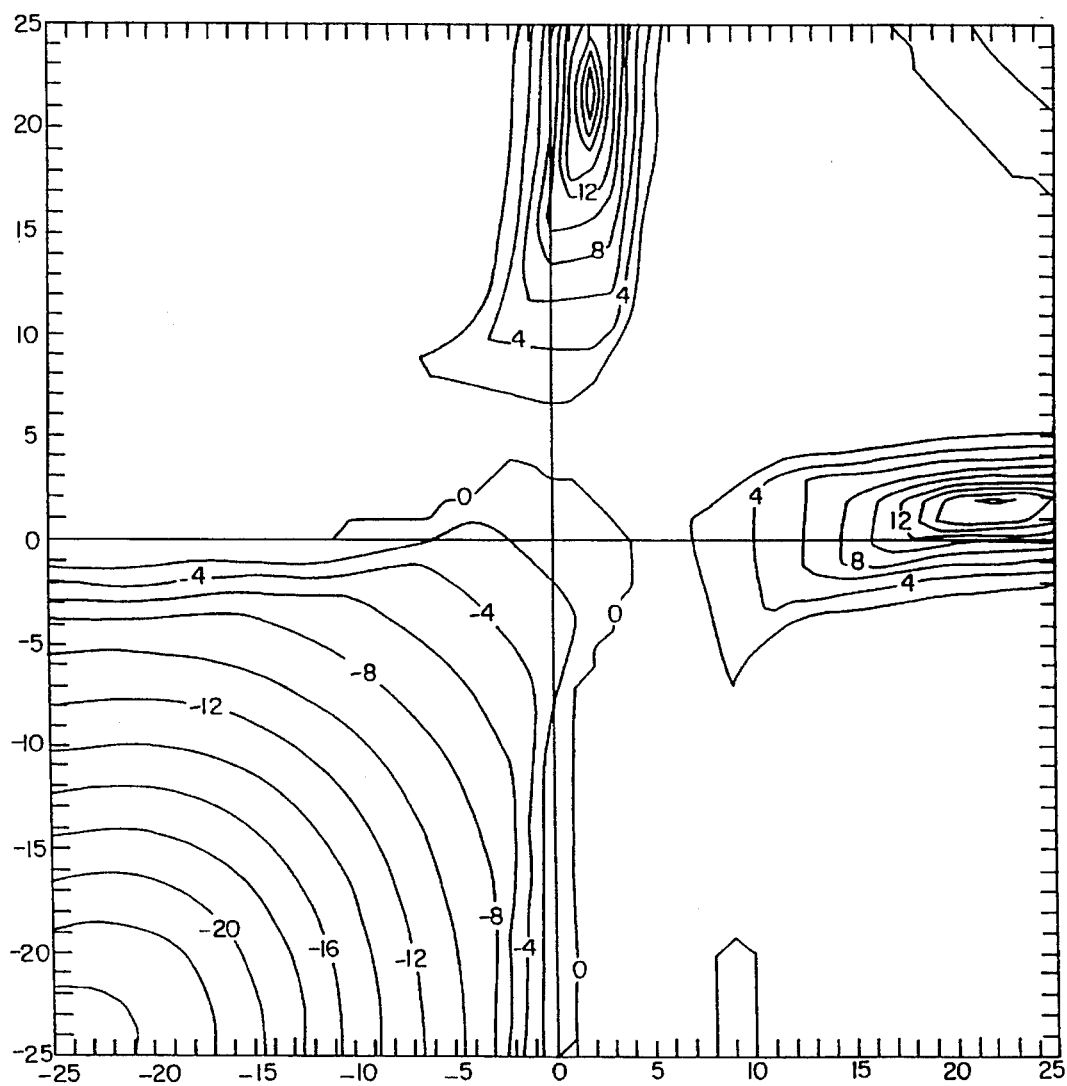
FIGS. 2a and 2b are contour plots of switching extinction ratios in terms of the operating voltages $V_1$ and $V_2$ for transverse electric (TE) polarization mode and transverse magnetic (TM) polarization mode, respectively, for a conventional reverse $\Delta\beta$ control directional coupler using tapered coupling.
Figure 2B:
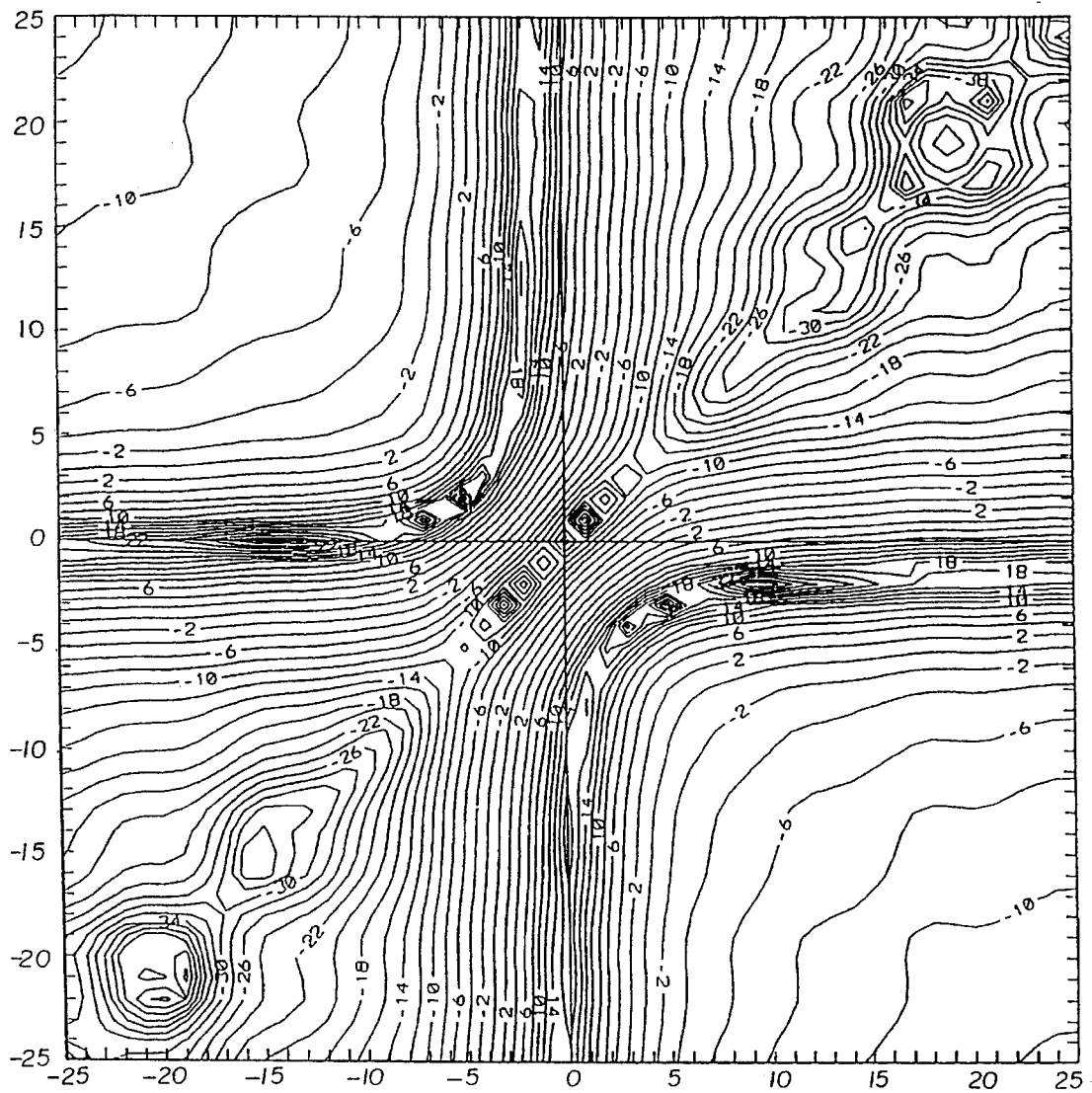

To generate the transfer function, the extinction ratio is measured for representative values of operating voltages $V_1$ and $V_2$, and the results are plotted as equal-value contours on a contour plot as shown, for example, in FIGS. 2a and 2b.

Wherever there is a positive contour (i.e., a ratio greater than 1), this indicates combinations of voltages $V_1$ and $V_2$ that result in cross states for the directional coupler where most of the light signal crosses over from the first wave guide to the second wave guide as it passes through the directional coupler. Whenever there is a negative contour (i.e., a ratio less than 1), this indicates combinations of voltages $V_1$ and $V_2$ that result in bar states wherein most of the light signal remains within the first wave guide as it passes through the directional coupler. Areas of the contour plots which represent high-quality cross states can be seen as peaks or ridges and areas of the contour plot which represent high-quality bar states can be seen as valleys. Typically, the required extinction ratio for high quality cross states will be at least 15 dB, although it will be understood that different values for the extinction ratio necessary to achieve a high quality cross state may be required for different applications or uses of a directional coupler.

A light signal entering a directional coupler can be thought of as the sum of its components in the two principal polarization modes, the transverse electric (TE) polarization mode and transverse magnetic (TM) polarization mode. Because a directional coupler will respond differently to the two different polarization modes, the present invention uses contour plots for both of the two different polarization modes in order to completely represent the transfer function of the directional coupler.

The experimental examples shown in FIGS. 2a, 2b, 2c, 4a, 4b, 4c, and 6a present data from devices in z-cut lithium niobate. In this case, the TM mode experiences a stronger electro-optic effect than the TE mode. It should be noted that for other material systems or crystal cuts this situation may be reversed.

FIGS. 2a and 2b show contour plots of switching extinction ratios in terms of the operating voltages $V_1$ and $V_2$ for TE polarization mode and TM polarization mode, respectively, for a conventional reverse $\Delta\beta$ control directional coupler. The differences between the contours of these two plots dramatically demonstrate the challenge faced in designing a polarization independent directional coupler. In FIG. 2a, the light signal is in TE polarization mode and the favorable operating points, TE cross state 40 and TE bar state 42, are about the origin and at the corners of the first and third quadrants of the graph, respectively. In contrast, FIG. 2b shows that, for the same directional coupler, when the light signal is in TM polarization mode, TM cross state 44 and TM bar state 46 are along the axis and along the diagonals of the graph, respectively.

Figure 2C:
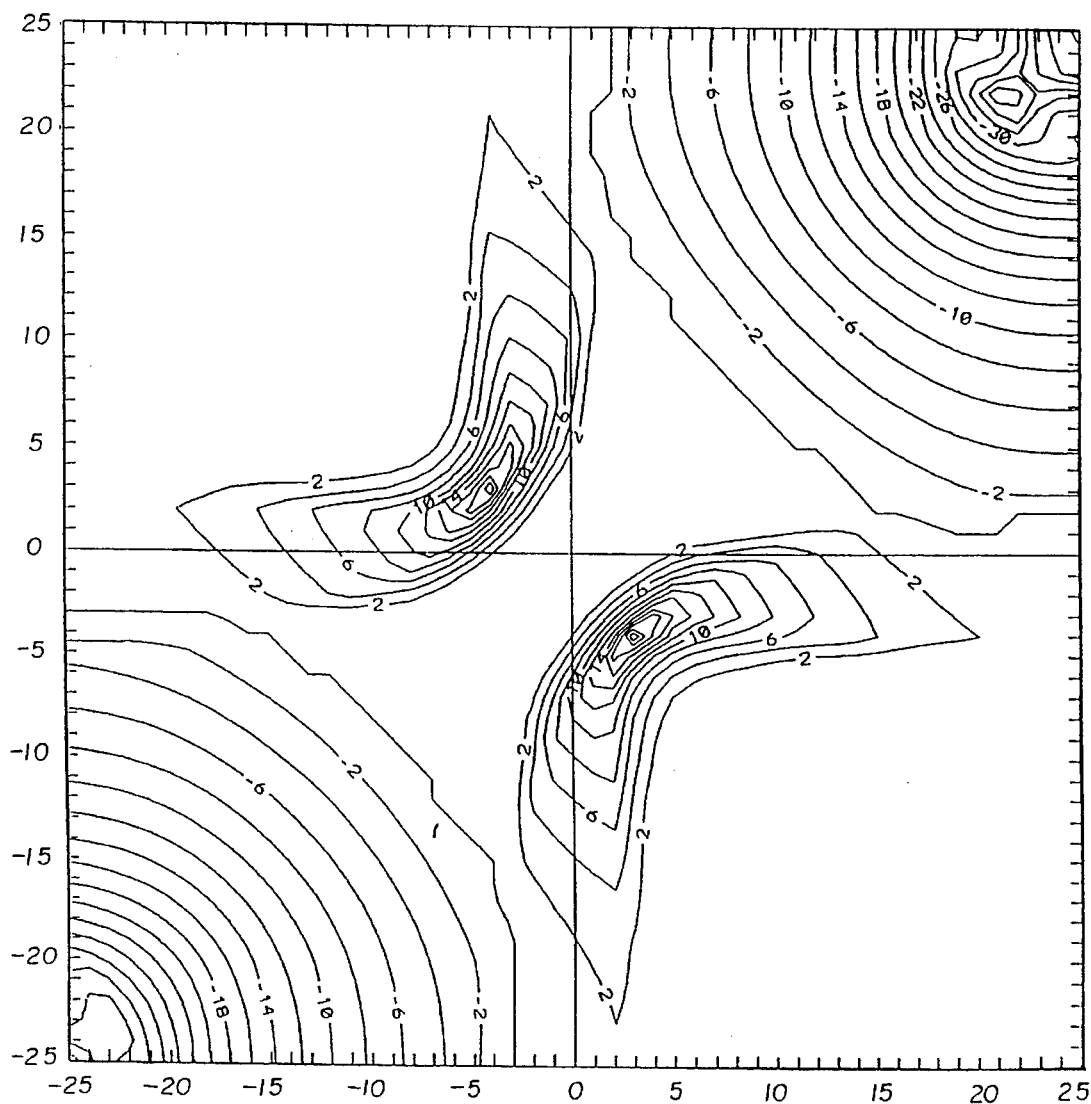
FIG. 2c is a composite contour plot showing a combined switching extinction ratio for both TE and TM polarization mode for the directional coupler of FIGS. 2a and 2b.

FIG. 2c is a composite contour plot showing the combined switching extinction ratio for both TE and TM polarization mode for the directional coupler of FIGS. 2a and 2b. At points in the $V_1 \times V_2$ plane where both ratios are positive (approaching a cross state), the lesser value is taken; at points where both are negative (approaching a bar state), the greater value is taken; at all other points, the function is assigned a value zero. By overlaying the contour plots in this way for both the TE and TM polarization modes, a composite contour plot is created which shows the relative "size" and "location" in the $V_1 \times V_2$ plane of any polarization-independent cross states 50 and polarization-independent bar states 52. For purposes of this example, polarization-independent cross states 50 will include only those areas of the contour plot having an extinction ratio of greater than 15 dB.

Because the "sizes" of polarization-independent cross states 50 in the combined contour plot shown in FIG. 2c are so small, the effective operating voltage ranges for $V_{1c}$ and $V_{2c}$ are severely constricted if a conventional reverse $\Delta\beta$ control directional coupler were to be operated in a "polarization independent" mode. In the example shown in FIG. 2c, the effective coupling lengths (l) have been carefully chosen for each of the TE and TM polarization modes to achieve the polarization-independent cross states 50 and bar states 52. Without this careful selection of effective coupling lengths (l), or if there are variations in the fabrication of the directional coupler, it is very likely that there will be no overlap of TE cross states 40 with TM cross states 44 and of TE bar states 42 with TM bar states 46, in which case there are no polarization-independent cross states 50 and polarization-independent bar states 52 of adequate extinction. In this case, the directional coupler simply cannot be operated as a polarization independent optical device.

As discussed in the background section, the conventional method of making a reverse $\Delta\beta$ control directional coupler polarization independent is to contrive the TE cross states to be close enough to the origin so as to overlap the TM cross states. This is accomplished through careful control of the strength of the optical coupling between the two wave guides. Unfortunately, it is very difficult to consistently reproduce these results in the manufacture of more than one directional coupler at a time. Additionally, this careful control necessarily requires the designer of the directional coupler to relinquish freedom of choice with respect to the length L, as well as the spacing G of the directional coupler and the effective coupling length l. The problems with the conventional approach to contriving polarization independence in a directional coupler are set forth by Watson, J. E. et al., "A Polarization-Independent 1×16 Guided-Wave Optical Switch Integrated on Lithium Niobate", *Journal of Lightwave Technology*, Vol. LT-4, No. 11, November 1986, which is incorporated herein by reference.

To solve the problem of polarization-independence, the present invention seeks to shift the entire TE contour plot with respect to the TM contour plot. In the present invention, the offset between the two contour plots is accomplished by a non-electro-optic modification of the wave guides within the directional coupler, but without affecting a chosen length L or the spacing G and effective coupling length l of the directional coupler. The degree of offset is selected so as to make the TE cross state peak coincide in operating voltages with a TM cross state peak, thereby creating a relatively large voltage tolerance where the sets of operating voltages allow for simultaneous TE and TM cross states.

In the present invention, the difference in optical path lengths between the two wave guides in the interaction region of the directional coupler is physically altered at operating voltages $V_{1c}$ and $V_{2c}$ equal zero. This modification creates an apparent difference in the propagation velocities of the two wave guides and is referred to as $\Delta\beta_0$; it has a static optical, rather than electro-optical, origin. When a non-electro-optic $\Delta\beta_0$ of this type is added to the directional coupler, the effects of the operating voltages $V_{1c}$ and $V_{2c}$ combine with this non-electro-optic $\Delta\beta_0$ in order to establish a polarization-independent optical switch state for the directional coupler.

In a preferred embodiment where the electro-optic material is lithium niobate or lithium tantalate, the non-electro-optic $\Delta\beta_0$ is created in the directional coupler in such a way that it has approximately both the same sign and magnitude for both the TE and TM polarizations. Because the electro-optic effect for the TM polarization mode is about three times greater than the electro-optic effect for the TE polarization mode, there is a net shifting of the entire set of operating voltages $V_1$ and $V_2$ for the TM mode with respect to the TE mode. In other words, the electric potential required to overcome the non-electro-optic $\Delta\beta_0$ for the TM mode is about three times smaller than that electric potential required for the TE mode. As a result, the shift in the location of the TM contour plot will be about three times smaller than the shift for the TE contour plot. It is this differential shift in positions of the TM and TE contour plots that is exploited by the present invention to cause a set of operating voltages for a TE cross-state peak to coincide with or overlie a set of operating voltages for a TM cross-state peak.

One method of creating a non-electro-optic $\Delta\beta_0$ would be to change the effective index of refraction of the wave guide, either by changing the width or composition of one of the two wave guides of the directional coupler. While this technique might be useful for certain materials and crystal cuts, it does not necessarily produce the most favorable results for one of the preferred materials of the present invention, lithium niobate. This is because the change in $\beta$ is about twice as much for TM as for TE for lithium niobate which means that the TM features of the combined contour plot would shift almost as much as the TE features and an impractically large total shift would be required in order to obtain the desired non-electro-optic differential shift which the present invention uses to coincide the operating voltages for both polarization modes.

Other alternate methods of creating a non-electro-optic $\Delta\beta_0$ would be to change the conditions under which the wave guide is operated, such as changing the temperature or pressure of the wave guide. These methods, however, have the obvious drawback of requiring controlled operating conditions in order to operate the wave guide.

Referring now to FIG. 3a, a uniform curved, uniform spacing embodiment of a reverse $\Delta\beta$ control polarization-independent directional coupler in accordance with a preferred embodiment of the present invention will be described. In directional coupler 60, the means for obtaining the desired shift of the switching characteristics described above is to make a static change to the structure of directional coupler 60 such that one of two wave guide channels 62 and 64 is slightly longer than the other. The additional length, referred to as $\Delta L$, is so small that the differential length can be created by making the centerline of the two wave guides 62 and 64 follow an arc of a circle of radius R that is very large in comparison with the length L of coupler 64. Preferably, the radius R is constant for a curvature region 66. For a $LiNbO_3$ electro-optic material having wave guide channels that are formed by doping of Ti and light signals having a wavelength between about 0.5 and 2.0 μm, the constant radius R should be between about 20 cm and 3 m, and optimally between about 0.5 and 2.0 m.

Because the light signal in the outer wave guide channel 62 must travel slightly further than that in the inner wave guide channel 64, the light signal in the outer wave guide channel 62 gradually falls behind, assuming the two wave guide channels are otherwise identical. It is this small "delay" that translates into the effective differential propagation constant $\Delta\beta_0$ which is desired. Because the amount of $\Delta\beta_0$ can be controlled by only changing the geometry of both of the wave guide channels 62 and 64 of directional coupler 60, an approximately equal change in the TE and TM polarization modes is obtained. Because the geometry of wave guide channels 62 and 64 can be extremely well-controlled by photolithography, for example, during the fabrication of directional coupler 60, the exact value of $\Delta\beta_0$ is extremely predictable and controllable.

A shift in relative phase caused by differential length is indistinguishable from a shift caused by differential $\beta$. An exemplary value of $\Delta\beta_0$ in a preferred embodiment is about 0.0001 to 0.0002 $\mu m^{-1}$ for a directional coupler of a length 26 mm implemented in lithium niobate for 1.3 μm light. This implies a phase change $\Delta\Phi$ of about 3 radians. An equivalent optical path length difference $\Delta L$ for $\lambda=1.3$ μm light and n=index of refraction in lithium niobate is:

$$\Delta L = \Delta\Phi/\beta = \Delta\Phi \, \lambda/2\pi n$$
$$= 0.28 \, \mu m$$

For a polarization-independent directional coupler 60 with wave guides 62 and 64 spaced G μm apart, center to center, and L mm long, with the center line of the coupler following an arc of a circle of radius R, the differential length $\Delta L$ is:

$$\Delta L = GL/R$$

If the spacing G between the wave guides is, for example, 14 μm, then for a length L the required radius R would be $$R = GL/\Delta L$$
$$= 1.3 \, m.$$

The direction of the differential shift of the two transfer functions in the combined contour plot depends on the direction of the curvature of the wave guide channels. If the outer (longer) wave guide 62 is under the positive electrode, then the shift is to more positive values of $V_1$ and $V_2$; if the inner wave guide 64 is under the positive electrode, the shift is toward more negative voltages. If the curvature of wave guides 62 and 64 changes sign at the mid-point in length of coupler 60, the $\Delta\beta_0$ will reverse midway along the coupler; the transfer function will, for example, move to a more positive $V_1$ and a more negative $V_2$. An example of a reversed-curvature polarization-independent direction coupler having an "S" shape is shown in FIG. 3b. By combining uniformly curved and reverse-curved shapes, the shift of the transfer function accomplished by the present invention can be made in any direction in $V_1 \times V_2$ space.

Figure 5:
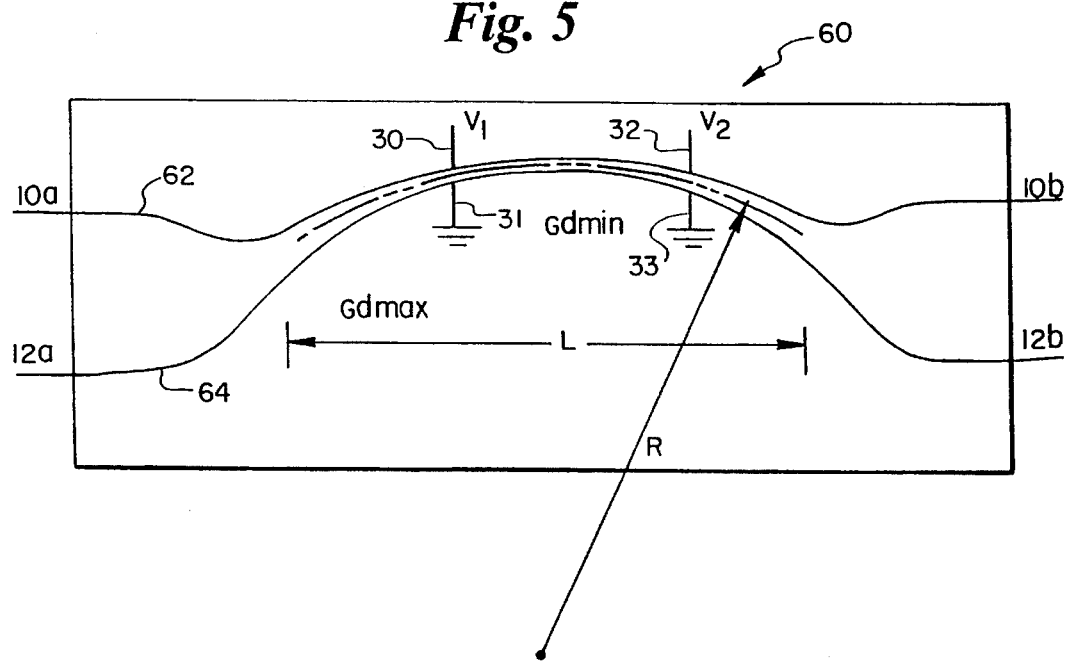
FIG. 5 is a schematic top plan diagram of a uniformly curved, tapered, polarization-independent reverse $\Delta\beta$ control directional coupler in accordance with a preferred embodiment of the present invention.

A preferred embodiment of a uniform curved, tapered spacing reverse $\Delta\beta$ control polarization-independent directional coupler in accordance with the present invention is shown in FIG. 5. In this embodiment, a converging, differential inter-wave guide channel spacing ($G_d$) has an effective inter-wave guide channel spacing ($G_d'$) equal to the desired inter-wave guide channel spacing (G). Preferably, the inter-wave guide channel spacing ($G_d$) is measured from the center of wave guide channel 62 to the center of wave guide channel 64. In this embodiment, the minimum channel spacing ($G_{dmin}$) is at the center of the coupling length (L) and the maximum channel spacing ($G_{dmax}$) is at the ends of each wave guide channel 62 and 64. It will be recognized that there are many variations which can be made in the manner and degree to which the wave guide channels are tapered, such as the techniques described, for example, in U.S. Pat. No. 4,243,295 issued to Alferness.

Figure 4A:
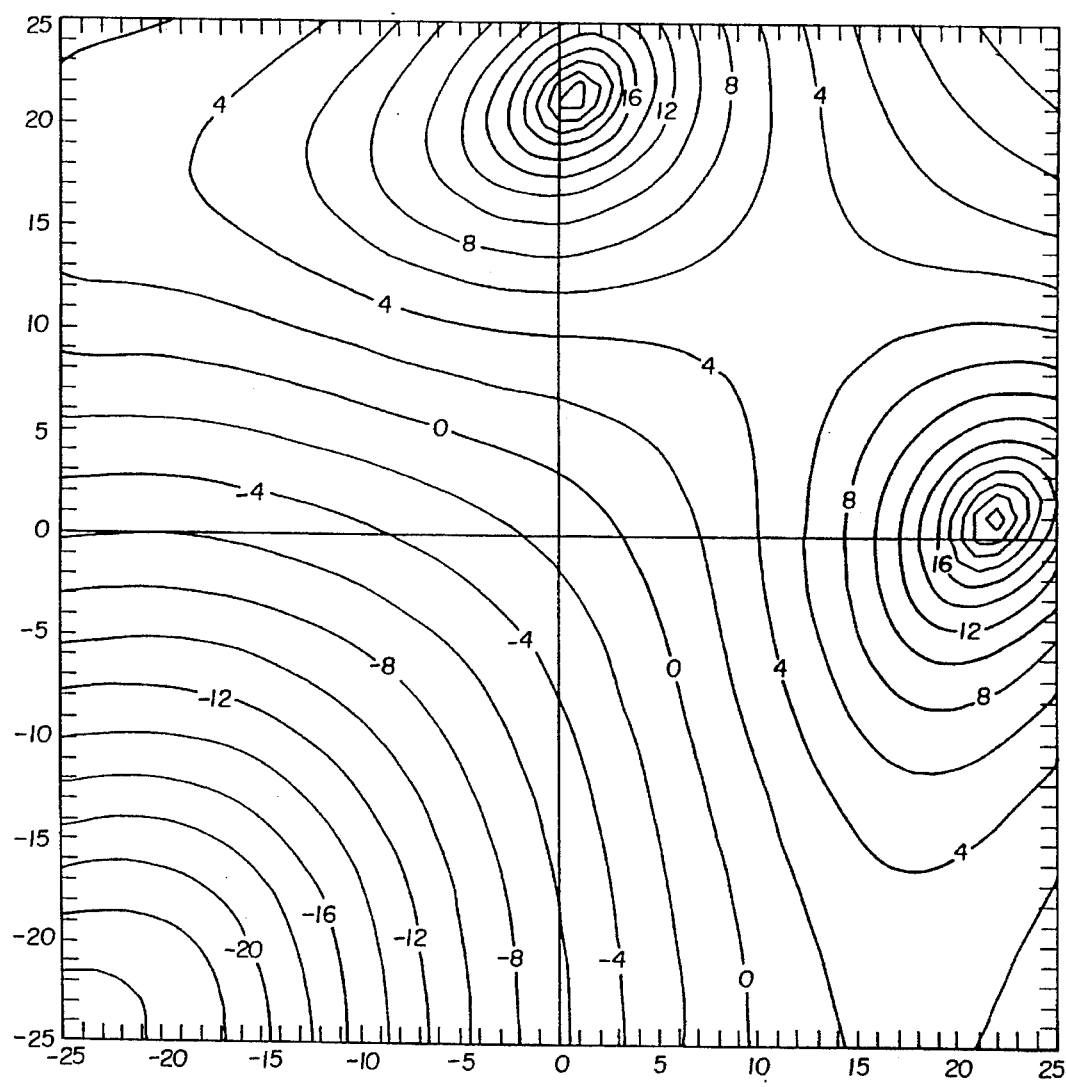
Figure 4B:
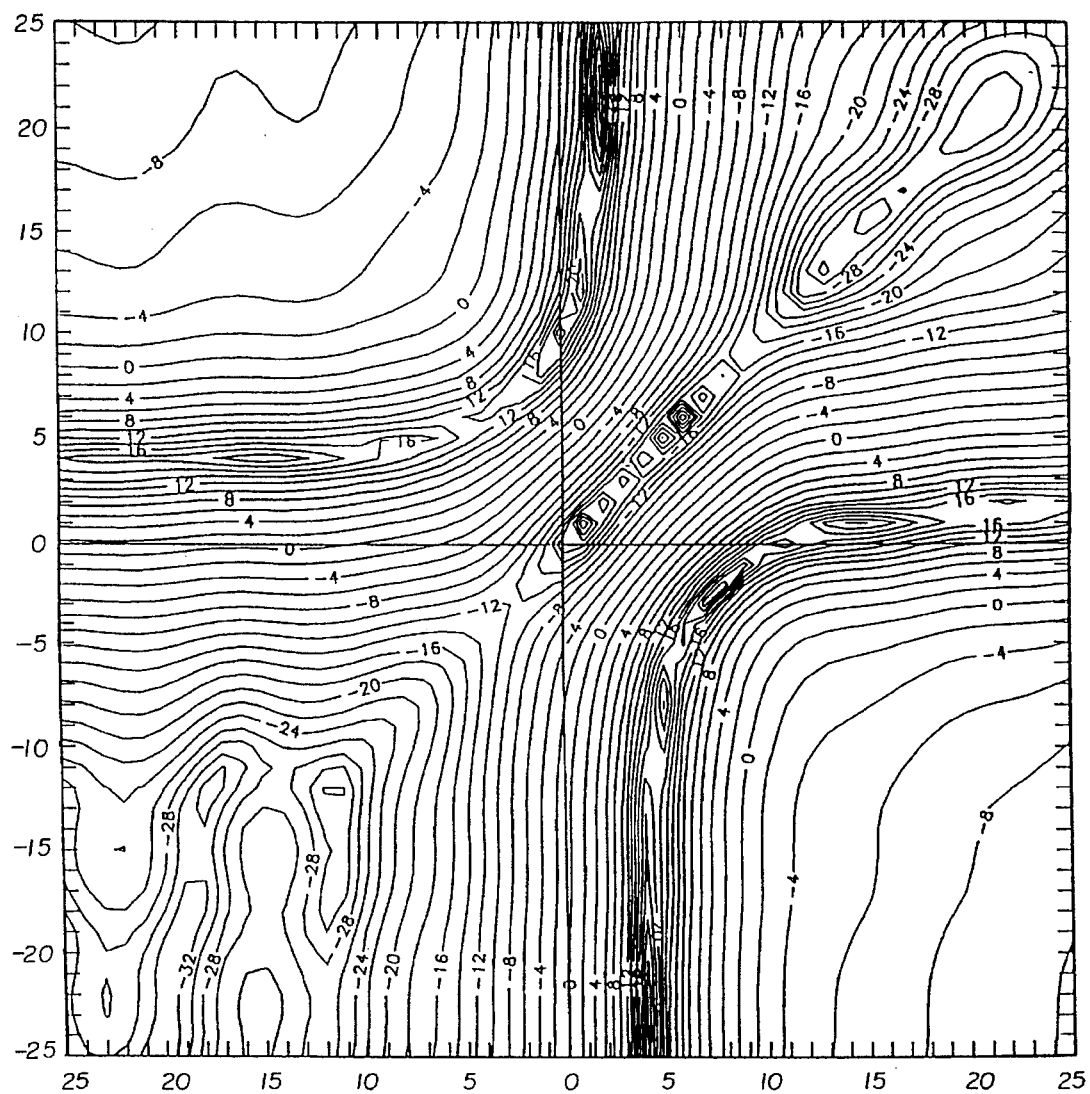
Figure 4C:
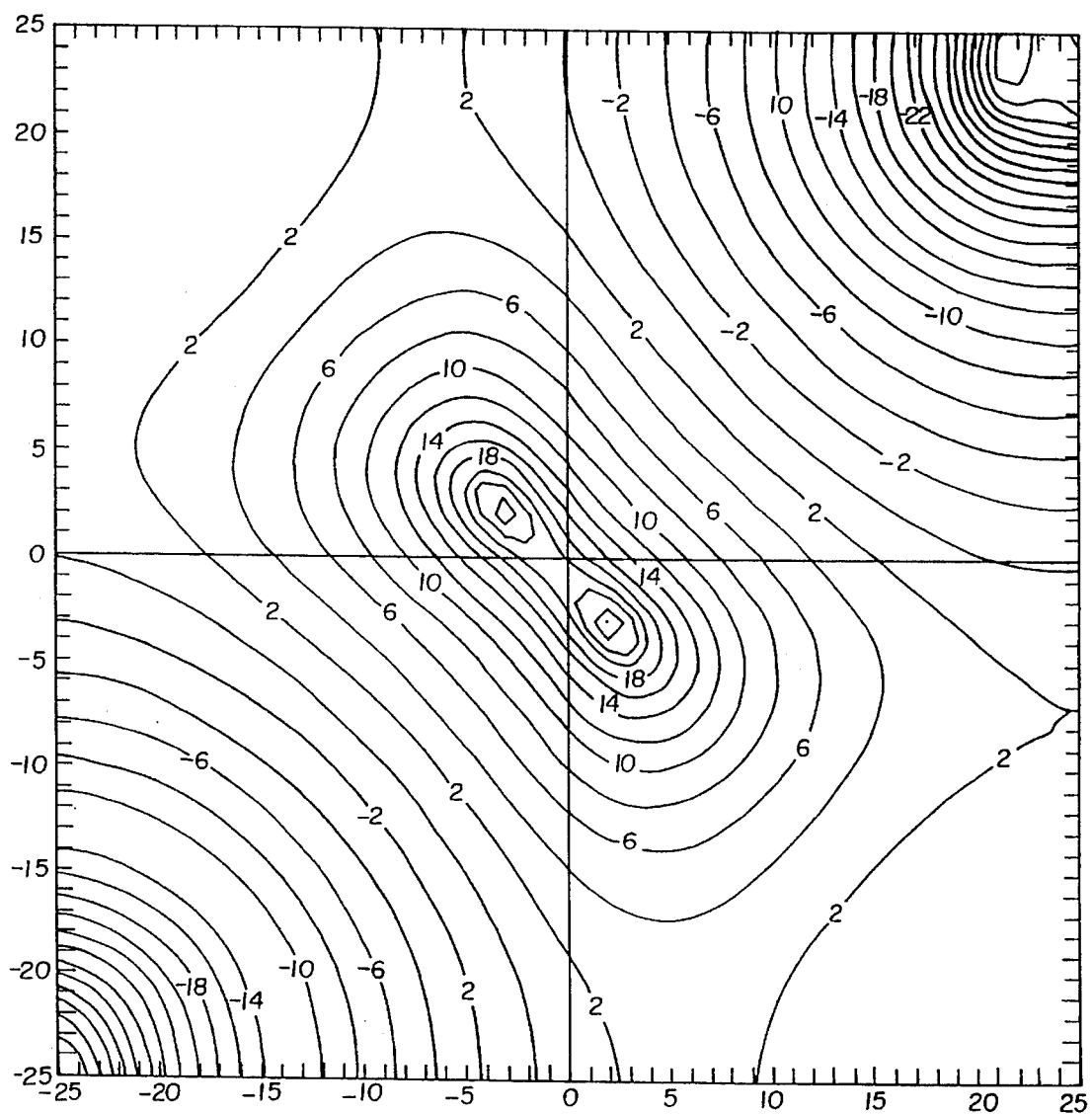
FIG. 4c is a composite contour plot showing the combined switching extinction ratio for both TE and TM polarization mode for the directional coupler of FIGS. 4a and 4b.

One example of a uniform-curvature, reverse $\Delta\beta$ control polarization-independent directional coupler in accordance with the present invention is a lithium niobate directional coupler 60 having wave guide channels of length L=30 mm and G=14 μm for 1.3 μm light and having a radius R=104 cm. FIGS. 4a and 4b show the TE and TM transfer functions measured for this directional coupler. FIG. 4c is a composite map showing worst-case polarization-independent operation for the polarization-independent directional coupler shown in FIGS. 4a and 4b. The composite map is made by comparing the TE and TM transfer functions in the manner as indicated with respect to FIG. 2c. The composite map shows a cross state area 50 in the $V_1 \times V_2$ plane of greater than 15 dB extinction; the extent of this cross state area 50 is much larger than could be attained without the technique employed here.

Referring now to FIGS. 6a and 6b, a figure of merit with respect to the critical ranges of the present invention will now be described. FIG. 6a shows a graph of sample measurements for the voltage offset versus reciprocal radius of curvature ($R^{-1}$) taken for the directional coupler 60 having the transfer function shown in FIG. 4c. The voltage offset for the TE polarization mode is shown at 70 and the voltage offset for the TM polarization mode is shown at 72. At ($R^{-1}$)=0, there is no curvature to directional coupler 60, and, hence, there is no offset in either the TE voltage offset or the TM voltage offset. As a curvature is applied to directional coupler 60, both the TE and TM voltage offsets begin to shift, however, the offset for the TE polarization mode shifts about three times as quickly as the offset for the TM polarization mode, as shown by the relative steepness of line 70 (TE voltage offset) to line 72 (TM voltage offset). Above a radius (R) of about 5 m, there is little usable difference between the two offsets 70 and 72 (as shown between $-0.20 < R^{-1} < 0.20$). Below 5 m, the difference between the two offsets 70 and 72 is used by the present invention to shift the TE cross state onto the TM cross state, thereby achieving a much larger operating range of polarization-independence than previously was possible.

While there exist examples of curved wave guides in previous directional couplers, such as shown for example in U.K. Patent 2 223 323 issued to Walker, none of these prior directional couplers have utilized curvature of the wave guides for the purpose of making the directional coupler polarization independent. Equally as important, the radii of curvatures suggested by these prior directional couplers are simply too small to achieve the objectives of polarization-independence of the present invention.

As indicated in the background section, the majority of the prior directional couplers effectively ignore the issue of polarization of the light signals and assume that light signals coupled by the device will be of a single polarization. The Walker patent is a good example of a directional coupler where the light signals are assumed to be of a single principal polarization. Without this assumption, it is not possible to give a well-defined meaning to $\beta$, $\Delta\beta$ and coupling strength as those terms are defined by Walker. As an example, Walker notes that $\Delta\beta$ in his directional coupler is proportional to voltage. By looking at FIG. 6a, it is apparent that this statement by Walker can be true only if a single polarization is assumed. If both TE and TM polarizations are present, then the statement made by Walker is not correct.

In both of the examples taught by Walker, the desired $\Delta\beta$ offset is about 4 mm$^{-1}$. Using this value, it is possible to calculate the necessary curvature of the wave guides. The desired $\Delta\beta$ offset can be expressed as the length (L) times a differential propagation constant $\Delta\beta$. Because the actual propagation constants $\beta$ are the same for the two wave guides, the geometrical path length difference ($\Delta L$) times that common $\beta$ gives the apparent $\Delta\beta$ times L. Thus, it is only necessary to calculate the path length difference of the two concentric arcs of radius R and R+G, where G is the separation, center-to-center, between the wave guides. If the inner arc has a length L, then the outer arc has a length L*(R+G)/R. The path length difference $\Delta L$ is LG/R and $$L\Delta\beta = \beta\Delta L$$
$$= \beta*LG/R$$

so that $$R = \beta G/\Delta\beta$$

Using these values and the typical parameters for a lithium niobate wave guide at $\lambda=1.3$ µm of $\beta=2\pi n/\lambda=1.06\times 10^4$ mm$^{-1}$ and G=$10^{-2}$ mm, the radius R for the curved wave guides taught by Walker is about 270 mm. Unfortunately, this radius is too short for low-loss wave guides and does not result in a practical directional coupler.

To achieve the desired polarization-independence of the present invention, it is most advantageous to design for a ratio of length (L) of the coupling region to effective coupling length for the TM polarization mode ($l_{TM}$) such that $L/l_{TM} \approx 2.0$. Depending upon which multiple of the effective coupling length (l) is used for the device, this ratio should satisfy the equation $(1+4m) < L/l_{TM} < (3+4m)$, where m is an integer greater than or equal to zero. This gives the desired ridge structure for the combined cross state 50 as shown in FIG. 4c. Because the TE cross state 40 generally lies outside the TM cross state ridge 44, as shown for example in FIGS. 2a and 2b, the preferred adjustment to is to shift the TE cross state 40 relative to the TM cross state 44, along the $V_1=V_2$ axis by using the uniform curvature coupler as shown in FIG. 5, for example. The amount of the shift always approximates the distance from the origin of the TE cross state 40. This "shift distance", expressed as $\Delta\beta$, is never greater than about $\Delta\beta L/\pi \approx 1.5$. On the other end of the range, shift distances of less than about $\Delta\beta L/\pi \approx 0.25$ are not useful because small shift are associated with $L/l_{TE}$ of very near 1 or 3 and these values are typical of the values used in the conventional method of obtaining polarization independence for directional couplers. Because the polarization with the weaker electro-optic effect (the TE mode in the example presented) also shifts, the shift of the polarization having the stronger effect must be enough to overtake the weaker. Thus the above range of shifts must be multiplied by a factor depending on the relative strengths of the electro-optic effect for the two polarizations. The factor is $F=r_1/(r_1-r_2)$, where $r_1$ is the stronger, and $r_2$ the weaker electro-optic coefficient. This factor, F, has a value near 1.5 for lithium niobate. Using these values, the desired range of curvatures which are useful in accordance with the present invention can be approximately expressed as follows:

$$0.25 \, F \leq \Delta\beta L/\pi \leq 1.5 \, F$$

Using this range, it is easy to calculate the useful range of curvature values expressed in terms of the geometry of the directional coupler and the wavelength l without reference to $\beta$. By substituting for $\beta=2\pi n/\lambda$, the useful minimum and maximum radius are:

$$R_{min} \approx 4nGL/(3F\lambda)$$

$$R_{max} \approx 24nGL/(3\lambda)$$

Typically, the most useful of curvature values will be in the middle between $R_{min}$ and $R_{max}$. FIG. 6b shows a table of various electro-optic materials and examples for these values in terms of $R_{min}$ and $R_{max}$. In addition, FIG. 6b shows the R calculated from the teachings of the Walker reference for each type of material demonstrating that the radius R from Walker is less than the $R_{min}$ of the present invention in each case.

By properly shifting the TE transfer function with respect to the TM transfer function, the area in the $V_1 \times V_2$ plane representing the voltage tolerance of acceptable polarization-independent cross-states 50 is increased. This larger area in the $V_1 \times V_2$ plane for polarization-independent cross-states 50 provides improvements in manufacturing yield and ease of use. The primary advantage of the present invention is an increase in the effective yield of directional couplers. By increasing the area of TE cross state 40 that coincides with TM cross state area 44 to produce a polarization-independent cross state 50, a practical directional coupler that is polarization independent is possible. By using the present invention, it has been found that the coupling between the wave guide channels 62 and 64 may vary by ±10% about the ideal for the TM mode, and by +10% to −50% for the TE mode, while still giving acceptable cross states. This contrasts with conventional design where the coupling between the wave guide channels 20 and 22 must be controlled to within about ±2.5%. An additional advantage is the ease of operation due to the increased cross state area 50. This translates into greater inter-device operating voltage tolerance such that the drive voltages of these devices do not need to be monitored and tuned for each device. An additional advantage is that the shift in TE transfer function moves the area of polarization-independent bar-state operation in the third quadrant of the $V_1 \times V_2$ plane towards the origin, thereby reducing the bar-state operating voltages $V_{1b}$ and $V_{2b}$ by the amount of the shift. A final advantage is reduced wavelength sensitivity. It has been found that when the radius R is greater than about 1 m, directional coupler 60 will tolerate about twice the variation in wavelength of the light signal before the cross state extinction ratio falls below acceptable levels.

Figure 7:
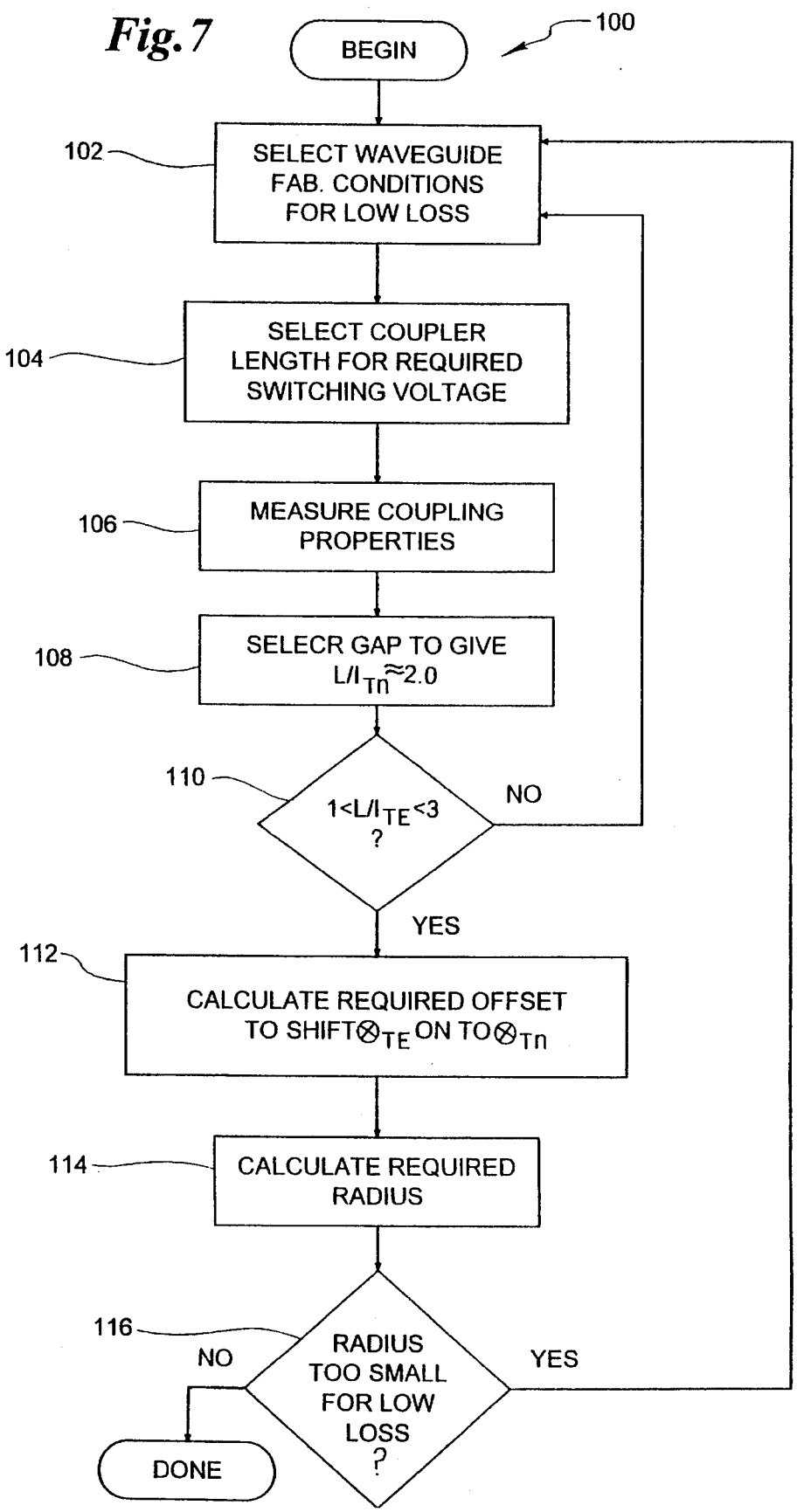
FIG. 7 is a flow chart showing the decisional steps in designing a polarization-independent reverse $\Delta\beta$ control directional coupler in accordance with the present invention.
Figure 2A:
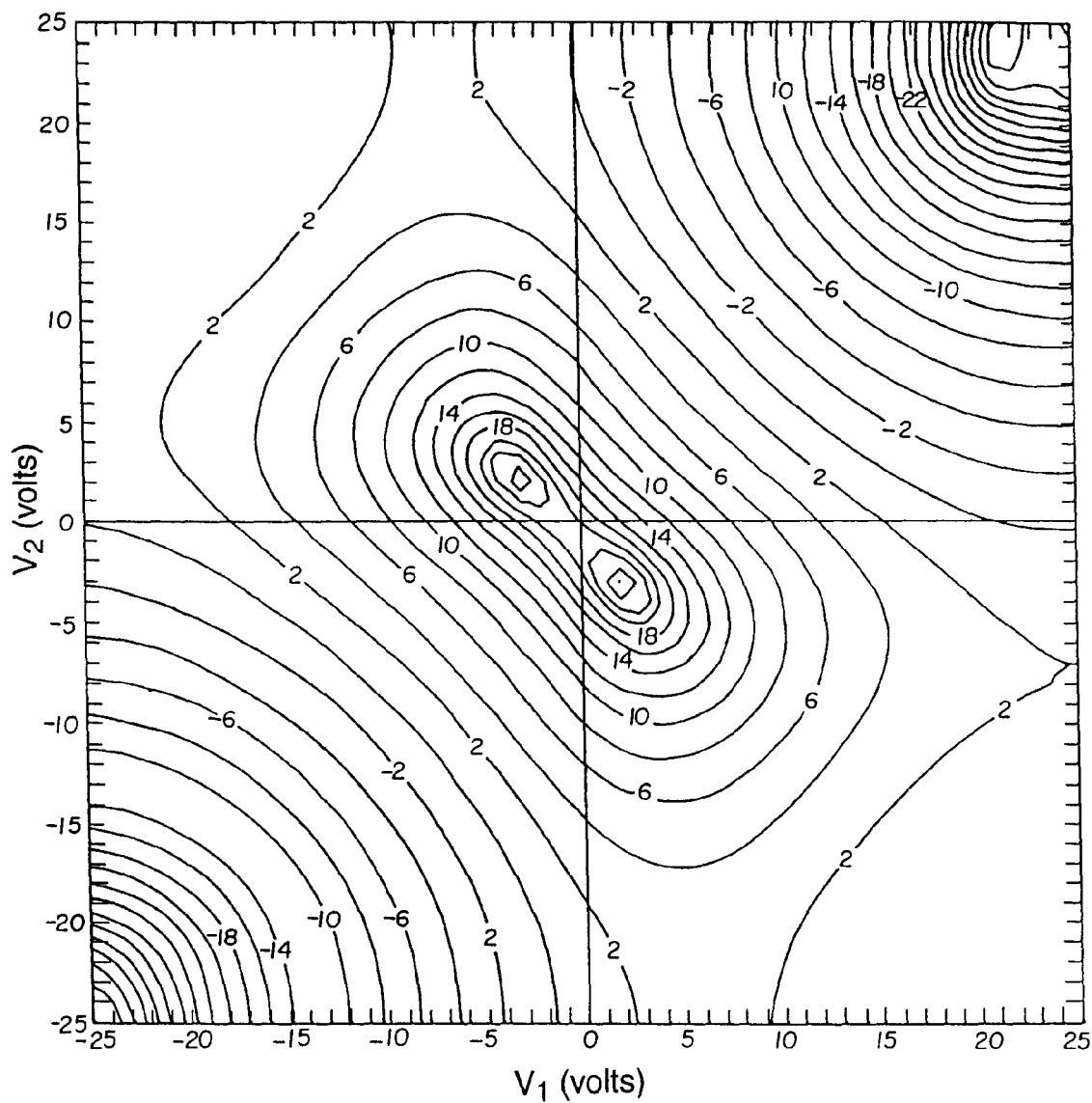
Figure 4C:
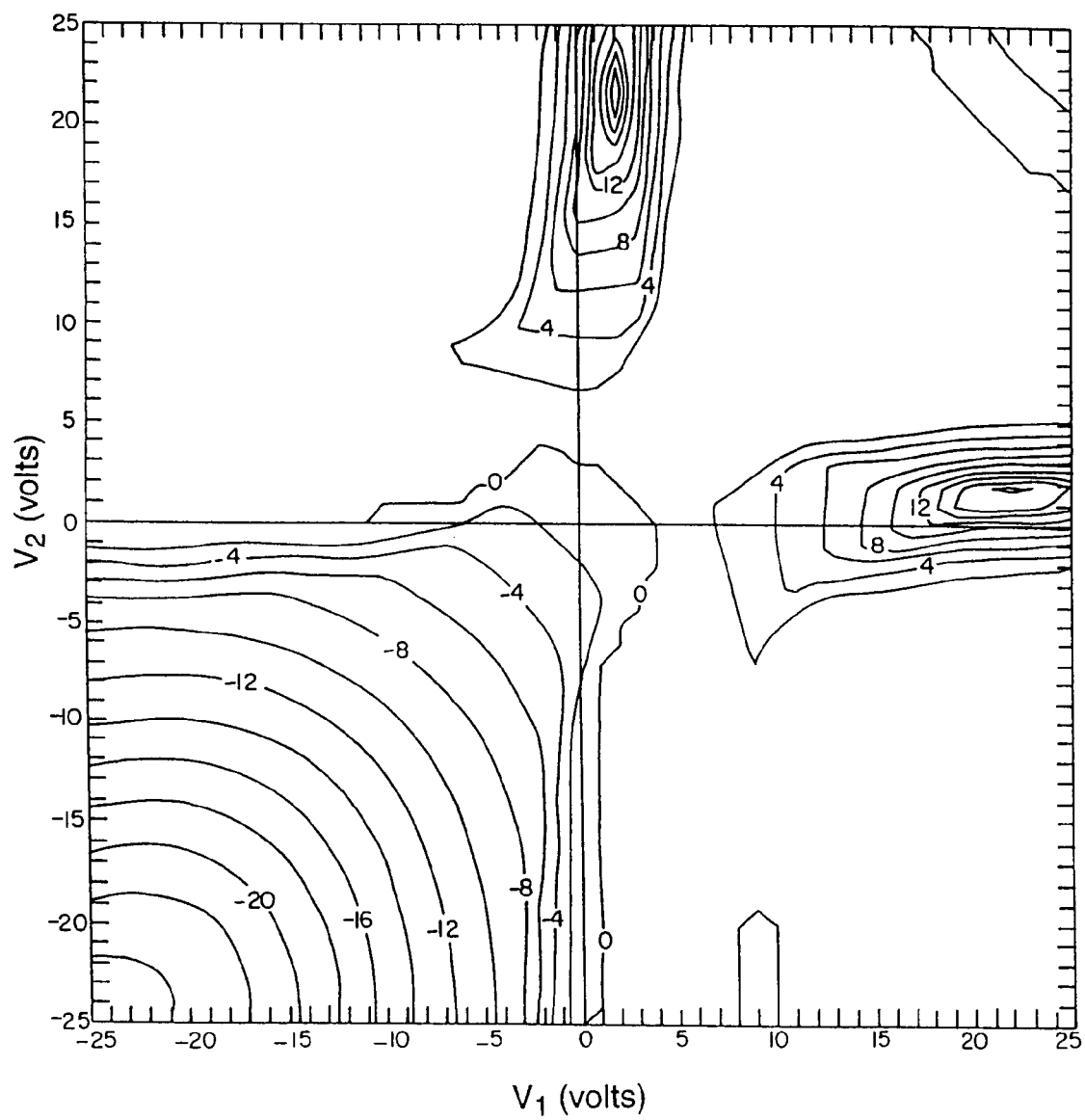

Referring now to FIG. 7, a preferred method of selecting the fabrication parameters for a directional coupler 60 in accordance with the present invention will be described. The fabrication parameters include the length (L) of coupler 60, the average inter-wave guide channel spacing (G) and the radius (R) in the curvature region. The method described with respect to FIG. 7 may be performed by hand making individual calculations for each required step, or may be implemented by a computer program, or any combination of the two. At step 100, a given electro-optic material, wavelength of light and desired operating voltage ranges $V_1$ and $V_2$ are provided to the designer. At step 102, the desired operating values for low optical power loss are chosen. In most directional couplers, the optical power loss will be chosen within a range of 2 dB to 4 dB. At step 104, a coupler length (L) is chosen based on the desired operating voltage ranges $V_1$ and $V_2$. For a reverse $\Delta\beta$ control direction coupler, it is typical to select a coupler length (L) that is a multiple of the coupling length (l) between the two wave guide channels in the coupling region. At step 106, the coupling properties for the given values and the chosen coupler length (L) are determined. Preferably, the coupling properties are determined by measurement, although these properties may also be estimated by calculation or be interpolated from prior measurements, for example. At step 108, an average inter-wave guide channel spacing (G) is selected such that the coupler length (L) is about twice the effective coupling length (l) for the TM polarization mode of the desired wavelength of light signal. At decision 110, if the ratio of the coupler length (L) to the effective coupling length (l) for the TE polarization mode of the desired wavelength of light signal is not between about (1+4 m) and (3+4 m), where m is an integer greater than or equal to zero, then the process is returned to step 102 to modify the low optical power loss conditions and the selection process is begun again.

If decision 110 is favorable, then a required offset in terms of voltages $V_{1c}$ and $V_{2c}$ is determined at step 112 so as to shift TE cross state 40 onto TM cross state 44. At step 114, a radius of curvature (R) of the wave guide channels 62 and 64 is calculated in terms of the differential length ($\Delta L$) necessary to achieve the required offset of operating voltages $V_1$ and $V_2$. At decision 116, a determination is made as to whether the radius of curvature (R) is too small for the particular materials and properties of the directional coupler so as to negatively impact the overall optical power loss of the directional coupler, thereby violating the low loss parameters chosen in step 102. For example, for lithium niobate, radius of curvature (R) less than about 30 mm will reduce the overall output of the directional coupler by 50% or greater. If the low loss parameters will be negatively affected by the radius of curvature (R), then the operation returns to step 102 to modify the low optical power loss parameters and the process is begun again, otherwise the selection process is complete.

We claim:

1. An electro-optically switched directional coupler utilizing reverse differential propagation constant control comprising:

an electro-optic material having at least a pair of wave guide channels within an interaction region having a given coupled length (L) and having a given effective inter-wave guide channel spacing (G) characterized by an effective coupling length (l);

at least a pair of electrodes for selectively producing an electric field across the wave guide channels which electro-optically alters an optical propagation constant of the wave guide channels so as to vary the effects of an optical coupling between the wave guide channels; and means for creating at least one differential optical path length between the wave guide channels in a non-electro-optical manner so as to coincide a set of operating voltages of an optical switch state of the directional coupler for a transverse magnetic (TM) polarization mode with a set of operating voltages of an optical switch state of the directional coupler for a transverse electric (TE) polarization mode such that when voltages within the coincided set of operating voltages are applied to the electrodes the optical switch state of the directional coupler is effectively independent of the polarization of a light signal incident to the directional coupler means for creating at least one differential optical path length comprises: a curvature region of the wave guide channels having a radius selected so as to shift the set of operating voltages of the optical switch state of the TM polarization mode relative to the set of operating voltage of the optical switch state of the TE polarization mode due to the relative difference between the magnitude of the electro-optic effect for the TM polarization mode light signal and the magnitude of the electro-optic effect for the TE polarization mode light signal.

2. The directional coupler of claim 1 wherein the curvature region comprises a constant radius for a centerline between the two wave guide channels having a value R such that:

$$4nGL/(3\lambda F) \leq R \leq 6nGL/\lambda$$

where n=index of refraction of the electro-optic material and $\lambda$=wavelength of the light signal, and $F=r_1/(r_1-r_2)$, where $r_1$ is the stronger, and $r_2$ the weaker electro-optic coefficient for the two polarization modes.

3. The directional coupler of claim 1 wherein the electro-optic material is $LiNbO_3$, the wave guide channels are formed by doping of Ti into the LiNbO$_3$, the light signal has a wavelength of between about 0.5 and 2.0 μm, and the curvature region comprises a constant radius for a centerline between the wave guide channels having a value of between about 20 cm and 3 m.

4. The directional coupler of claim 3 wherein the constant radius is between about 0.5 and 2.0 m.

5. The directional coupler of claim 1 wherein the curvature region is a uniform curve of a constant radius.

6. The directional coupler of claim 1 wherein the curvature region includes one or more reverse curves each of a constant radius.

7. The directional coupler of claim 1 wherein the optical switch state of the directional coupler is a cross state.

8. The directional coupler of claim 1 wherein the optical switch state of the directional coupler is a cross state for the TE polarization mode and a bar state for the TM polarization mode.

9. The directional coupler of claim 1 wherein the optical switch state of the directional coupler is a bar state for the TE polarization mode and a cross state for the TM polarization mode.

10. The directional coupler of claim 1 further comprising:
means for optically increasing a switching extinction ratio of the directional coupler separate from the means for creating at least one differential optical path length.

11. The directional coupler of claim 10 wherein the means for optically increasing the switching extinction ratio comprises:
a varying inter-wave guide channel spacing ($G_d$) having an effective inter-wave guide channel spacing ($G_d'$) equal to the given inter-wave guide channel spacing (G).

12. A polarization-independent electro-optically switched directional coupler utilizing reverse differential propagation constant control comprising:
an electro-optic material having at least a pair of wave guide channels within an interaction region; and
at least a pair of electrodes for selectively producing an electric field across the wave guide channels which electro-optically alters an optical propagation constant of the wave guide channels so as to vary the effects of an optical coupling between the wave guide channels, the wave guide channels having a curvature region defined by a constant radius that is selected so as to coincide a set of operating voltages of a cross state of the directional coupler for a transverse magnetic (TM) polarization mode with a set of operating voltages of a cross state of the directional coupler for a transverse electric (TE) polarization mode by shifting the cross state of the TM polarization mode relative to the cross state of the TE polarization mode due to the relative difference between the magnitude of the electro-optic effect for the TM polarization mode light signal and the magnitude of the electro-optic effect for the TE polarization mode light signal such that an effect of the optical coupling between the wave guide channels is, for the cross state, effectively independent of the polarization of a light signal incident to the directional coupler means for creating at least one differential optical path length comprises: a curvature region of the wave guide channels having a radius selected so as to shift the set of operating voltages of the optical switch state of the TM polarization mode relative to the set of operating voltage of the optical switch state of the TE polarization mode due to the relative difference between the magnitude of the electro-optic effect for the TM polarization mode light signal and the magnitude of the electro- optic effect for the TE polarization mode light signal.

13. The polarization-independent directional coupler of claim 12 wherein the curvature region comprises a constant radius for a centerline between the two wave guide channels having a value R such that:

$$4nGL/(3\lambda F) \leq R \leq 6nGL/\lambda$$

where n=index of refraction of the electro-optic material and λ=wavelength of the light signal, and $F=r_1/(r_1-r_2)$, where $r_1$ is the stronger, and $r_2$ the weaker electro-optic coefficient for the two polarization modes.

14. The polarization-independent directional coupler of claim 12 wherein the electro-optic material is LiNbO$_3$, the wave guide channels are formed by infusion of Ti into the LiNbO$_3$, the light signal has a wavelength of between about 0.5 and 2.0 μm, and the curvature region comprises a constant radius for a centerline between the wave guide channels having a value of between about 20 cm and 3 m.

15. The polarization-independent directional coupler of claim 14 wherein the constant radius is between about 0.5 and 2.0 m.

16. The polarization-independent directional coupler of claim 12 wherein the wave guide channels are not parallel and include a converging, differential inter-wave guide channel spacing ($G_d$) having an effective inter-wave guide channel spacing ($G_d'$) equal to the given inter-wave guide channel spacing (G).

17. A method for selecting design parameters for a polarization-independent directional coupler utilizing reverse differential propagation constant control and formed of an electro-optic material having at least a pair of wave guide channels within an interaction region and at least a pair of electrodes for selectively producing an electric field across the wave guide channels which electro-optically alters an optical propagation constant of the wave guide channels so as to vary an optical coupling between the wave guide channels, the method comprising the steps of:

(a) for a given electro-optic material and wavelength of light, providing a desired set of operating voltages for the electrodes for the directional coupler;

(b) choosing a maximum optical power loss for the directional coupler;

(c) choosing a set of wave guide fabrication conditions for the directional coupler such that an optical power loss of the directional coupler is at or below the maximum optical power loss;

(d) choosing a coupler length (L) based on the desired set of operating voltages;

(e) determining an effective coupling length (l) for both a TM polarization mode and a TE polarization mode of the wavelength of light for the values given by steps (a)–(d);

(f) choosing an average inter-wave guide channel spacing (G) such that the coupler length (L) is about twice the effective coupling length (l) for the TM polarization mode;

(g) if the ratio of the coupler length (L) to the effective coupling length (l) for the TE polarization mode is not between about (1+4 m) and (3+4 m), where m is an integer greater than or equal to zero, returning to step (b) to modify the maximum optical power loss chosen;

(h) determining a required offset of the set of operating voltages of the electrodes for an optical switch state as to shift the optical switch state for a TE polarization mode onto the optical switch state for a TM polarization mode;

(i) determining a radius of curvature (R) for the pair of wave guide channels in terms of a differential length ($\Delta l$) of the pair of wave guide channels necessary to achieve the required offset of the operating voltages;

(j) if the radius of curvature (R) results in an optical power loss of the directional coupler that is more than the maximum optical power loss chosen in step (b), returning to steps (b)–(d) to modify one or more of the choices in those steps;

(k) using the coupler length (L), the average inter-wave guide channel spacing (G) and the radius of curvature (R) to design the polarization-independent directional coupler.

18. The method of claim 17 wherein the chosen radius of curvature (R) has a value R such that:

$$4nGL/(3\lambda F) \leq R \leq 6nGL/\lambda$$

where n=index of refraction of the electro-optic material and $\lambda$=wavelength of the light signal, and $F=r_1/(r_1-r_2)$, where $r_1$ is the stronger, and $r_2$ the weaker electro-optic coefficient for the two polarization modes.

19. The method of claim 18 wherein the optical switch state of the directional coupler is the cross state.

* * * * *

UNITED STATES PATENT AND TRADEMARK OFFICE
CERTIFICATE OF CORRECTION

PATENT NO.   : 5,495,544
DATED        : February 27, 1996
INVENTOR(S)  : Terry L. Smith, Daniel V. Attanasio and James E. Watson It is certified that error appears in the above-identified patent and that said Letters Patent is hereby corrected as shown below:

Drawings,
"Fig. 2A" should be noted as -- Fig. 4C --; and
"Fig. 4C" should be noted as -- Fig. 2A --; as shown on attached pages.

Signed and Sealed this

Eighteenth Day of June, 2002

Attest:

JAMES E. ROGAN
Attesting Officer     Director of the United States Patent and Trademark Office Contours represent (cross-state output power)/
(bar-state output power) in decibles.

Contours represent (cross-state output power)/
(bar-state output power) in decibles.